United States Patent [15] 3,696,340

Matsushita et al. [45] Oct. 3, 1972

[54] MICROPROGRAM EXECUTION CONTROL FOR FAULT DIAGNOSIS

[72] Inventors: Shigenori Matsushita; Fumitaka Sato; Haruhisa Miura, all of Tokyo, Japan

[73] Assignee: Tokyo Shibaura Electric Co., Ltd., Kawasaki-shi, Japan

[22] Filed: Nov. 9, 1970

[21] Appl. No.: 87,832

[30] Foreign Application Priority Data

Nov. 10, 1970 Japan ......................45/89281

[52] U.S. Cl. ................................................340/172.5

[51] Int. Cl. ................................................G06f 9/16

[58] Field of Search ....................340/172.5; 235/153

[56] References Cited

UNITED STATES PATENTS

| | | | |
|---|---|---|---|
| 3,325,788 | 6/1967 | Hackl | 340/172.5 |
| 3,343,141 | 9/1967 | Hackl | 340/172.5 |
| 3,380,025 | 4/1968 | Ragland | 340/172.5 |
| 3,391,394 | 7/1968 | Ottaway et al | 340/172.5 |
| 3,404,378 | 10/1968 | Threadgold et al | 340/172.5 |
| 3,405,258 | 10/1968 | Godoy et al. | 340/172.5 X |
| 3,509,541 | 4/1970 | Gordon | 340/172.5 |
| 3,518,413 | 6/1970 | Holtey | 340/172.5 X |

*Primary Examiner*—Paul J. Henon

*Assistant Examiner*—Melvin B. Chapnick

*Attorney*—Kemon, Palmer & Estabrook

[57] ABSTRACT

A microprogram execution control for fault diagnosis includes a first and a second address register. The first address register designates the microaddress of one microstep stored in a fixed memory which is designated by a diagnostic microprogram information succeeding a diagnostic program instruction from a main memory. After one microstep is executed, the first address register designates a specified microaddress in the fixed memory, and the second address register stores the microaddress of a next microstep to be executed. At a step during the succeeding diagnostic routine, the content of the second address register is stored into the main memory.

12 Claims, 9 Drawing Figures

INVENTORS
SHIGENORI MATSUSHITA
FUMITAKA SATO
HARUHISA MIURA
BY
Kemon, Palmer & Estabrook

INVENTORS
BY

INVENTORS
SHIGENORI MATSUSHITA
FUMITAKA SATO
BY HARUHISA MIURA
Kenyon, Palmer & Estabrook INVENTORS
SHIGENORI MATSUSHITA
FUMITAKA SATO
HARUHISA MIURA
BY
Kemon, Palmer & Estabrook INVENTORS
SHIGENORI MATSUSHITA
FUMITAKA SATO
HARUHISA MIURA
BY
Kemon Palmer & Estabrook

MICROPROGRAM EXECUTION CONTROL FOR FAULT DIAGNOSIS

BACKGROUND OF THE INVENTION

The present invention relates to a microprogram sequence control for data processing systems and more particularly to a microprogram sequence control adapted for fault diagnosis.

There is increasing need to use a diagnostic program in detecting faults in a data processing system, particularly in a central processing unit (hereinafter referred to as "CPU") included therein by an information processing unit itself and to provide a separate unit for processing special diagnostic instructions so as to facilitate preparation of a diagnostic program. Prominently excellent among the techniques already known in this particular field is the U.S. Pat. No. 3,325,788.

For better understanding of the present invention will now be outlined the prior art. It is known to store special or diagnostic instructions in a microprogram controlled CPU, designating a microstep sequence of an arbitrary length staring with a given microstep by the diagnostic instruction, joining the designated microstep sequences and executing them as a series of operations, thereby facilitating fault diagnosis. The diagnostic instructions and the succeeding words (hereinafter referred to as "control words") have a field capable of designating the starting point and length of microstep sequences to be joined together for execution. The CPU includes means for starting the execution of a sequence of microinstructions thus designated and means upon completion of the execution of said sequence of microinstructions for interrupting any further execution of the intrinsically designated microinstructions and reading out the succeeding control word. Such diagnostic instructions and the succeeding control words also include bits for designating the unconditional execution of microsteps following those already designated by nullifying "sequence length designating information" included in the control words. All the aforementioned operations are presented in FIG. 1. SUMMARY OF THE INVENTION An object of the present invention is to provide microprogram controls for fault diagnosis permitting an easy preparation of a diagnostic program.

Another object of the invention is to provide microprogram controls permitting an easy diagnosis of the branching of microprograms.

Still another object of the invention is to provide reliable microprogram controls requiring only very small amounts of hardware so as to upgrade the reliability of diagnosis.

According to the present invention, a microprogram sequence control is provided comprising:

A main memory for storing extrinsically variable program instructions and information;

a fixed memory for storing a microprogram which consists of microsteps to be capable of information processing operations of the program instruction stored in the main memory;

a first address register for designating microaddress of the fixed memory;

a sequence control circuit for advancing ordinally the microaddress of the first address register in order predetermined intrinsically and for changing the microaddress of the first address register by means of designation of the program information in accordance with a particular program instruction when this program instruction is detected;

means for setting a fixed microaddress to the first address register at specified steps of processing said particular program instruction;

a second address register for storing a microaddress of a next microstep to be executed next time at said steps; and means for storing the content of the second address register to the main memory.

DESCRIPTION OF THE PREFERRED EMBODIMENTS

To clearly define the object of the present invention, the outline and advantages of the invention will now be described with reference to FIG. 2.

Figure 1:
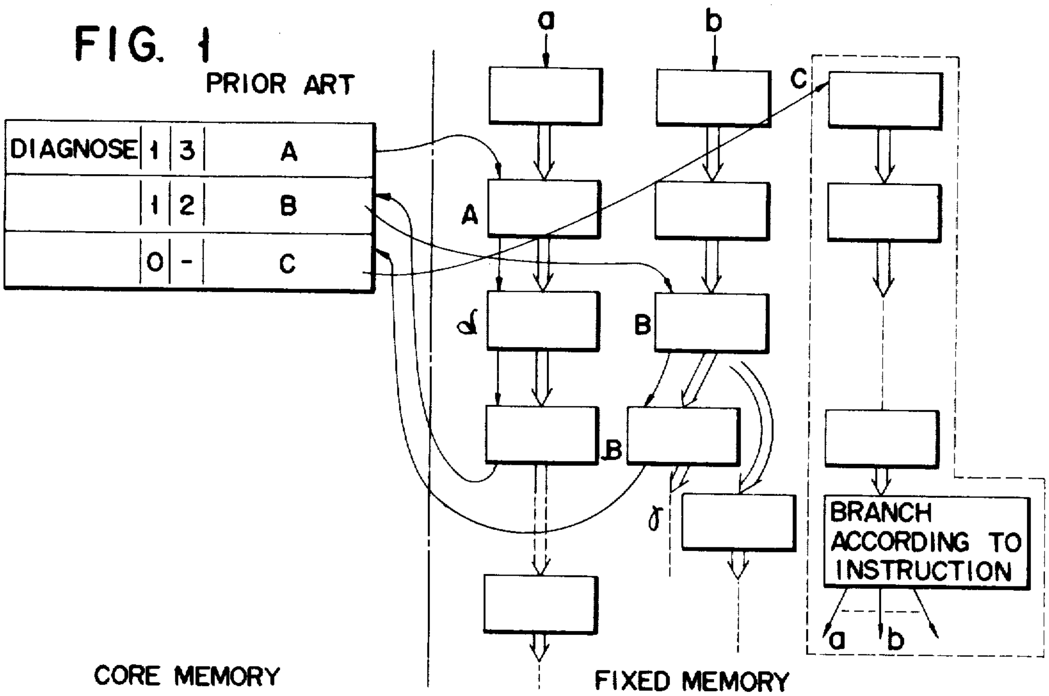
FIG. 1 is a diagram useful in explaining the operation of the conventional microprogram sequence control.

Throughout the specification, a special program instruction used by a programmer for diagnosis is designated as XEMS (Execute Microstep) instruction. Since this XEMS instruction can be arbitrarily applied by a programmer, it may be referred to as an extrinsically variable particular program instruction. FIG. 2 schematically illustrates the operation of the XEMS instruction. There is executed a microstep (A address) designated by words succeeding the XEMS instruction or microstep pointer words (hereinafter referred to as "MPW") and the bit 12 of the MPW is examined. Since the bit 12 denotes "0, " the succeeding microstep (B address) designated by the MPW is executed. Thereafter the bit 11 of MPW is checked. Since the bit 11 shows "1, " the inner state of the CPU is written in the core memory. A particular address of the core memory (or 83 address in the later described embodiment of the present invention) contains information (N address) indicating what part of the core memory should receive information on the inner state of CPU. When such information is written, the content (N address) of the 83 address is renewed to N+1. The information on the inner state of the CPU thus written includes the β address of the microstep which should have been executed next time. The diagnostic program performs fault by examining the information of the β address, thus permitting an easy formation of a program to diagnose a fault occurring in the hardware performing the branching of a microprogram. Further, as mentioned above, the diagnostic program is furnished with means for finding the address of the microstep which should have been executed next time, thus eliminating the necessity of executing the B and β addresses in succession as shown in FIG. 1. While the diagnostic instruction of the prior art executed a sequence of microsteps, the XEMS instruction of the present invention only requires a single microstep to be executed. Accordingly, the XEMS instruction does not need the CAC hardware which was used with the diagnostic instruction of the prior art in designating the number of microstep sequences to be executed.

After the inner states of the CPU obtained by execution of the B address microstep are written in the core memory, the bit 12 of MPW is examined. Since the bit 12 indicates "1 " in FIG. 2, it is seen that MPW is the last section of the XEMS instruction. Thus after distinguishing the content of the bit 12 of MPW, the microprogram of CPU skips over to the head (C microaddress) of the instruction fetch routine enclosed in broken lines. This means that the execution of the XEMS instruction has been brought to an end and that of the succeeding instruction is ready to be effected.

Figure 2:
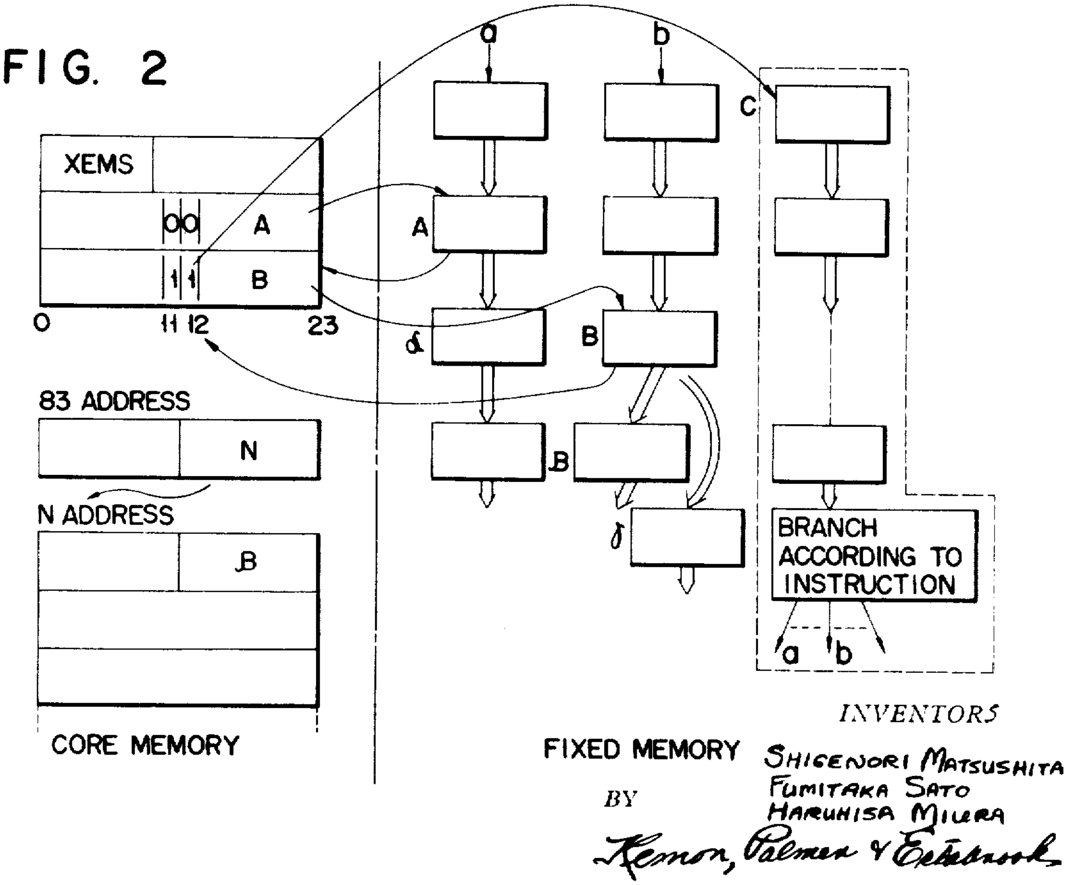
FIG. 2 is a diagram useful in explaining the operation of a microprogram sequence control according to the present invention.

Comparison of FIG. 2 with FIG. 1 will show that according to the present invention, each word of information required to specify the execution of the succeeding instruction after completion of the diagnostic instruction (designated as DIAGNOSE in the prior art and XEMS in the present invention) only consists of one bit, simplifying a diagnostic program using the XEMS instruction. Of course, the DIAGNOSE instruction of the prior art and the XEMS instruction of the present invention are each formed of a total of three words. However, this is for the reason that the present invention is intended to eliminate the necessity of using the address section of the XEMS instruction. Said elimination reduces the requirement of hardware, and further the freedom from fault of the XEMS instruction executing unit decreases the requirement of hardware to detect a fault.

When the bit 11 of MPW is at "1" not only the microstep address to be executed next time, but also the contents of, for example, registers and flip-flop circuits which have heretofore been inaccessible by an extrinsically prepared program can be written in the core memory. With the prior art, one control word was used in specifying a particular microstep or particular work (Kernel) and the contents of, for example, extrinsically inaccessible registers were written in the core memory by execution of said microstep or Kernel. In contrast, the XEMS instruction of the present invention only requires designation by the bit 11 alone, obviously shortening a diagnostic program.

Figure 3:
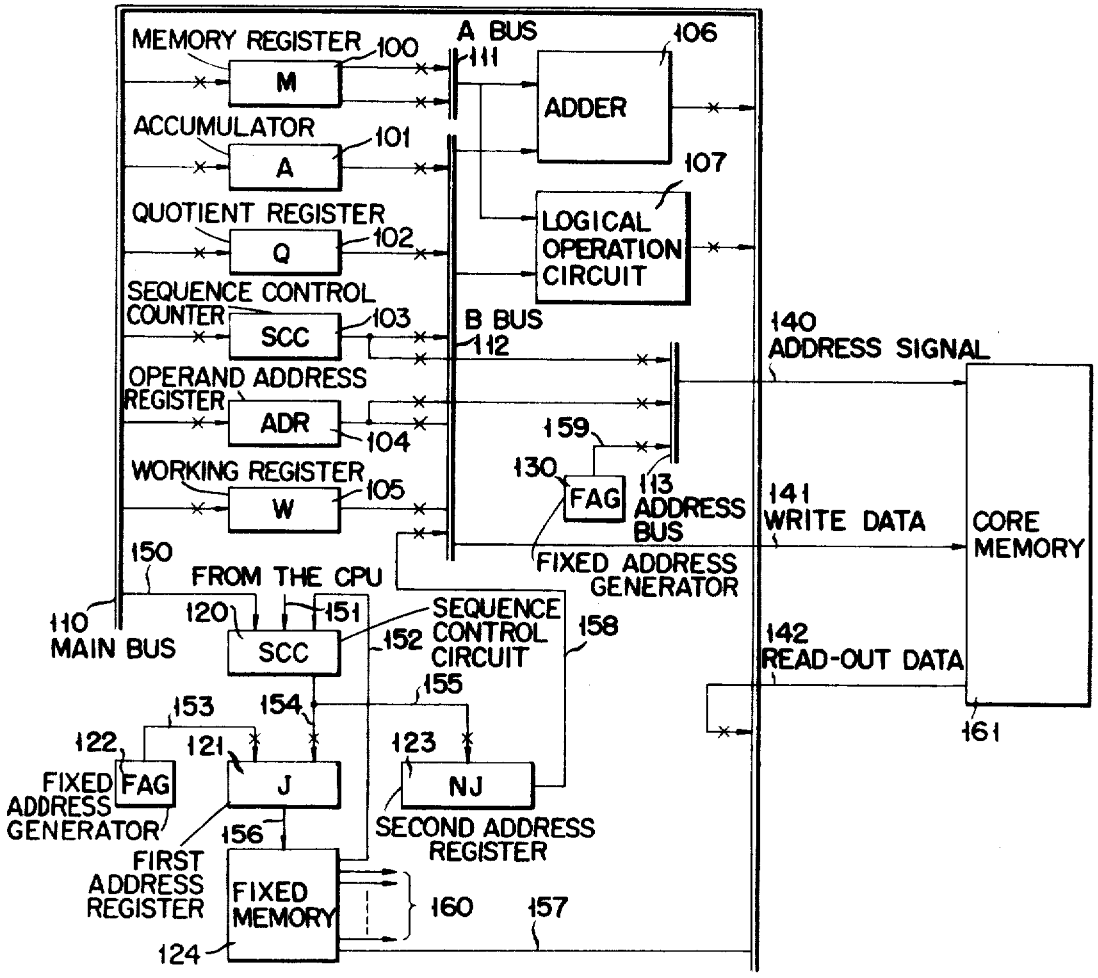
FIG. 3 is a schematic circuit diagram of a data processing apparatus including a microprogram sequence control according to one embodiment of the invention.

A microprogram sequence control according to an embodiment of the present invention will now be described with reference to FIGS. 3 and 6 so as clearly to define it practicability. FIG. 3 is a block diagram of a fault diagnosis microprogram control according to an embodiment of the present invention. Parts having no direct relationship with the present invention are omitted from this figure. Registers such as A (accumulator) 101, Q (quotient register) 102 and SCC (sequence control counter) 103 are of the general type which is extrinsically accessible by a program, and description thereof is omitted. Outputs, positive or negative, from M (memory register) 100 are conducted to A bus 111. Data of the A101 are supplied from the A bus to an adder 106 and logical operation circuit 107. As used herein, the marks X denote gate circuits, which are controlled by outputs from the later described fixed memory. W (working register) 105 is a register for temporarily storing the results of operation, ADR (operand address register) 104 supplies, like SCC 103, an address bus 113 with signals so as to conduct an address signal 140 to a core memory 161. A main bus 110 is supplied with data 142 read out from the core memory 161, and further with the results of operation from the adder 106 and logical operation circuit 107. Data are divided into the respective functions and are conducted to the aforementioned registers M 100, A 101, Q 102 SCC 103, ADR 104, and W 105. Outputs from these registers excluding M 100 are supplied to B bus 112, which in turn furnishes data to the adder 106 and logical operation circuit 107, and further supplies write in data 141 to the core memory 161.

The aforementioned arrangement which is not directly related to the object of the present invention has been briefly touched. The present invention is primarily associated with the following arrangement. FAG (fixed address generator) 103 generates a special address 159 for the core memory 161. Hereinafter, 83 address is taken as an example. This 83 address is the one stored with the address of the core memory 161 which should store the address of a microstep to be executed next time. Outputs 159 from the FAG 130 are supplied to the address bus 113, which in turn supplies address signals 140 to the core memory 161. A fixed memory (hereinafter referred to as "F/M") 124 stores a microprogram which consists of microsteps capable of information processing operations of the program instruction stored in the core memory 161. Outputs from the fixed memory 124 constitute signals 157 supplied to the main bus 110, signals 152 conducted to a sequence control circuit 120 for control of a microstep to be executed next time and signals 160 for control of gate circuits indicated by the marks X so as to perform the information processing operation. The sequence control circuit 120 controls the F/M 124 by signals 150 from the main bus 110, signals 151 from the various units of the CPU and the aforesaid signals 152 normally in an intrinsically determined sequence, and upon detection of the XEMS instruction varies the microaddress of F/M 124 according to a microprogram information specified by said XEMS instruction. Outputs from the sequence control circuit 120 constitute address signals 154 and 155 supplied to a first address register (hereinafter referred to as J) 121 and a second address register (hereinafter referred to as NJ) 123, respectively. Accordingly, output 156 from J 121 specifies the microstep stored in the F/M 124. FAG (fixed address generator) 122 is a circuit for generating a particular address signal 153 so as to set J 121 at a particular microaddress. NJ 123 is a register for storing microaddress information of a microstep (for example, $\beta$ address of FIG. 2) which should have executed in succession to the microstep (for example, the B address of FIG. 2) executed by the XEMS instruction. Outputs 158 from NJ 123 are conducted to the B bus 112, writing information of said $\beta$ microaddress in the core memory 161.

Figure 4:
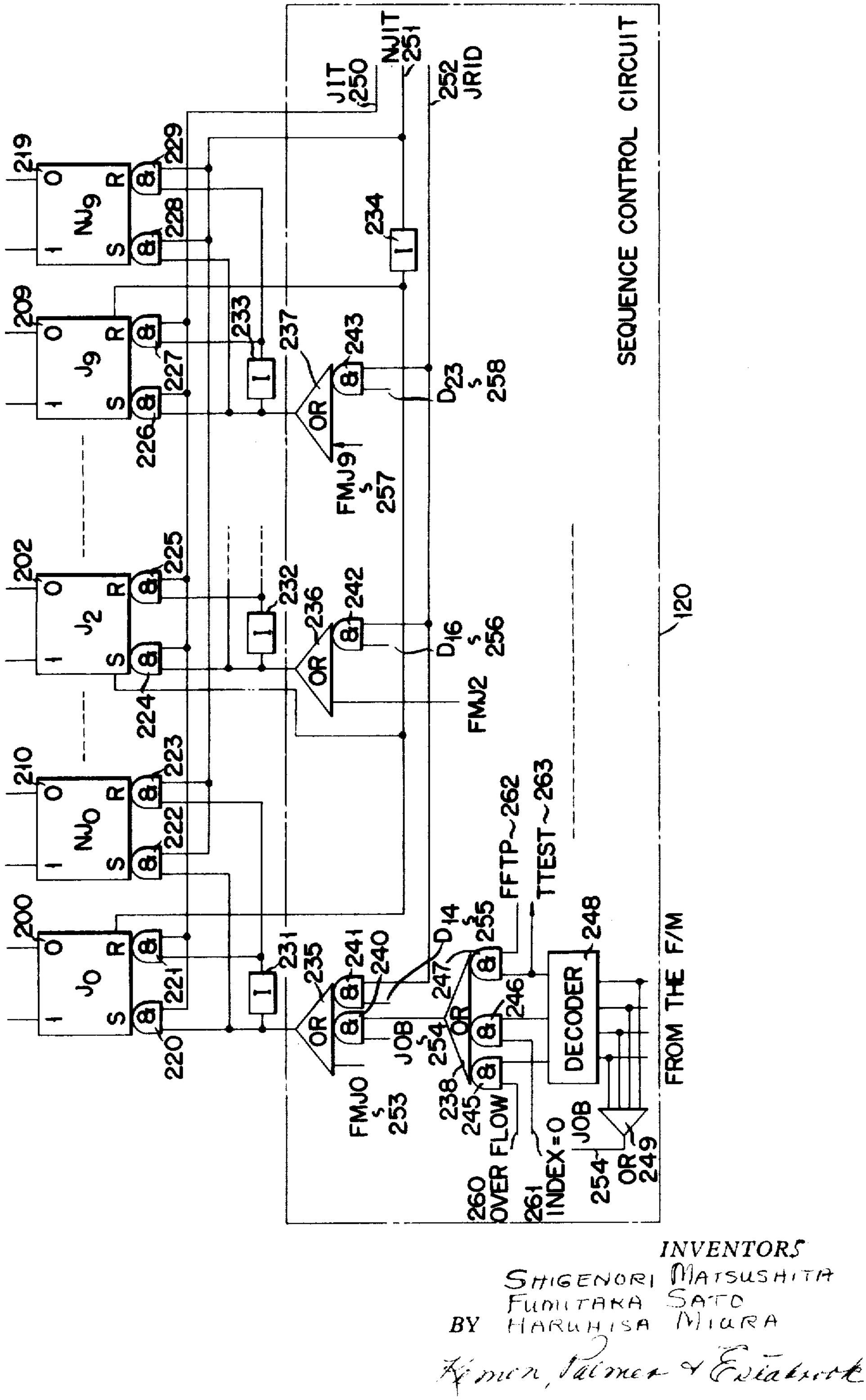
FIG. 4 is a detailed circuit diagram of the main part of the same microprogram sequence control according to the embodiment.

FIG. 4 is a block diagram showing in detail part of the sequence control circuit 120, J 121, FAG 122 and NJ 123 of FIG. 3. J 121 consists of ten flip-flops as $J_0$ 200 . . . $J_2$ 202 . . . $J_9$ 209 and NJ 123 is similarly formed of ten flip-flops as $NJ_0$ 201 . . . $NJ_9$ 219. The set and reset inputs to $J_0$ 200 and $NJ_9$ 219. The set and reset inputs to $J_0$ 200 and $NJ_0$ 210 are constituted by two groups of AND gates of 220–221 and 222–223, respectively. These two groups of AND gates are opened by signals JIT 250 and signals NJIT 251, respectively. Similarly, $J_2$ 202 has a group of AND gates 224–225 $J_9$ 209 a group of AND-gates 226–227, and $NJ_9$ 219 a group of AND gates 228–229, said $J_2$ and $NJ_9$ being supplied with set and reset inputs. The signals NJIT 251 are supplied through an inverter 234 to the reset input terminals of $J_0$ 200 . . . $J_9$ 209 and to the set input terminal of $J_2$ 202. The direct setting of said $J_2$ 202 by the inverted signal of NJIT 251 means that J 121 is set at the 200 microaddress, namely, that said J 121 is set at a particular microaddress at the later described specified steps of operation. The setting of a microstep of said 200 address in J 121 means that FAG 122 of FIG. 3 supplies J 121 with a particular microaddress (220 address).

The sequence control circuit 120 for controlling address information stored in the address registers J 121 and NJ 123 is indicated in a region defined by broken lines in FIG. 4. A first OR-gate 235 corresponds to the bits of $J_0$ 200 and $NJ_0$ 210. Outputs from the OR-gate 235 are supplied directly to the AND-gates 220 and 222 and through an inverter 231 and AND-gates 221 and 223. Output signal from the OR-gate 235 and signal JIT 250 set the $J_0$ 200. On the other hand, output signal from the OR-gate 235 and signal NJIT 251 set the $NJ_0$ 210. When the OR-gate 235 ceases to give forth any output and signals JIT 250 and NJIT 251 are generated, then the address registers $J_0$ 200 and $NJ_0$ 210 are reset. The OR gate 235 is supplied with signals FMJO 253 from F/M, signal from an AND-gate 240 supplied with output from an OR gate 238 and signal JOB 254, and signal from an AND-gate 241 supplied with signal $D_{14}$ 255 of the bit 14 of the main bus 110 and signal JRID 252. FMJO 253 is used when F/M 124 designates the $J_0$ bit of the succeeding microstep. JOB 254 is obtained when an OR gate 249 is supplied with four bits included in outputs from F/M 124. This JOB 254 is used when branching is conducted using the $J_0$ bit. $D_{14}$ 255 is the signal of the bit 14 of the main bus 110 and is used when said bus 110 supplies address information. Outputs from a third OR gate 236 are supplied to the set or reset input of $J_2$ directly or through an inverter 232. The set or reset input of $NJ_2$ (not shown) is also supplied with outputs from the third OR gate 236 directly or through the inverter 232. Outputs from a 10 OR-gate 237 are supplied to $J_9$ 209 and $NJ_9$ 219 directly or through an inverter 233. The OR-gate 236 is supplied with information $D_{16}$ 256 of the bit 16 of the main bus 110 by JRID 252 through an AND-gate 242 and with signals FMJ2 from the F/M124. The OR-gate 237 is supplied with FMJ9 257 which is used when F/M designates the $J_9$ bit of the succeeding microstep. The OR-gate 237 is further supplied with information $D_{23}$ 258 of the bit 23 of the main bus 110 by JRID 252 through an AND-gate 243. This JRID 252 is output from F/M 124 and used to transfer informations $D_{14}$ 255 to $D_{23}$ 258 of the main bus 110 transferred to J, whereby the address information of the XEMS of FIG. 2 is supplied to J 121.

Branching information supplied to the AND-gate 240 for control of branching is obtained by the OR-gate 238. Inputs to this OR-gate 238 consist of outputs from AND-gates 245, 246, and 247. These AND-gates 245, 246, and 247 are supplied with signals obtained by decoding information of four bits from F/M 124 by a decoder 248. Conditions of conducting branching from the various units of the CPU include, for example, signals 260 for determining the evidence of overflow, outputs 261 from a zero detector for examining the index part and further FFTP 262 is indicated which is a special branching condition. TTEST 263, output from F/M 124, is only generated when output of four bits from F/M 124 all indicate "1." For each J bit there is provided, through not shown in FIG. 4, an OR gate like the OR-gate 238.

Figure 5:
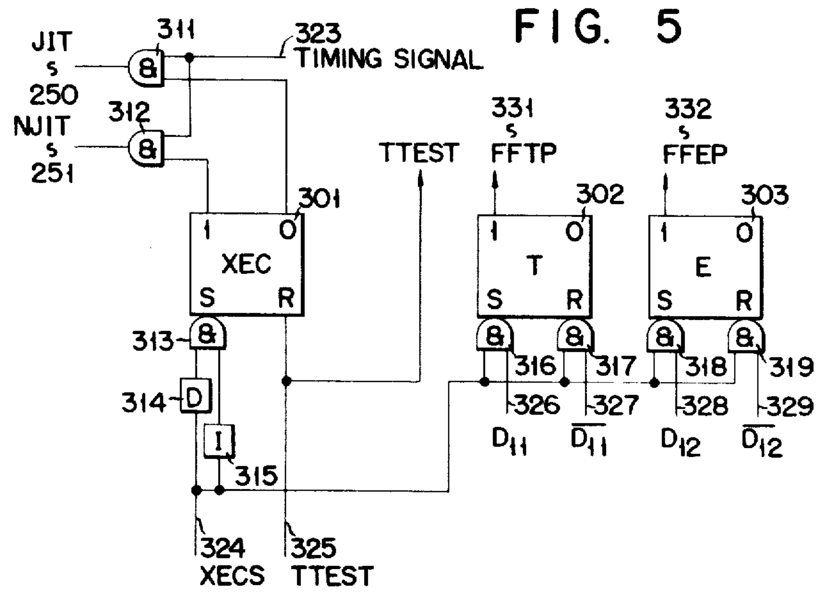
FIG. 5 is a fragmental circuit diagram included in the embodiment.

FIG. 5 shows that part of the sequence control circuits 120 of FIG. 3 which is particularly required for execution of the XEMS instruction. An AND-gate 313, delay circuit 314 and inverter 315 connected to the set terminal of a flip-flop XEC (XEMS control) 301 are used to set the flip-flop XEC 301 when XECS (XEMS control signal) is changed from "1" to "0 "XECS 324 is generated from F/M to indicate the completed execution of one microstep. TTEST (trace test) completed execution of one microstep. TTEST (trace test) 325 from F/M 124 is a signal to examine a flip-flop T (trace) 302 and to carry out branching according to the result of such examination. TTEST 325 is also supplied to the reset terminal of XEC 301. The positive and negative outputs from XEC 301 are supplied to AND-gates 311 and 312 together with a timing signal 323. The AND-gate 311 generates JIT 250 and the AND-gate 312 gives forth NJIT 251. When a timing signal 323 microstep XEC supplied with the succeeding microstep address by NJIT 251. When a timing signal 323 is generated and XEC 301 is reset, then J 121 is supplied by JIT 250 with the microaddress of a microstep to be executed next time. On the other hand, the bits 11 and 12 indicated by the MPW of the XEMS instruction of FIG. 2 generate signals $D_{11}$ 326, $\bar{D}_{11}$ 327, $D_{12}$ 328 and $\bar{D}_{12}$ 329 in the positive and negative forms. These signals are supplied to the set-reset terminals of the flip-flops T (trace) 302 and E (end) 303 through AND-gates 316, 317, 318 and 319. The input AND gates of these flip-flops T 302 and E 303 are opened by XECS 324. Upon execution, therefore, of the B address microstep in FIG. 2, XECS 324 is generated to set the flip-flops T 302 and E 303, because the bits 11 and 23 indicate "1."When these flip-flops T 302 and 303 are set, signals FFTP 331 and FFEP 332 are generated respectively, therefrom. The generated FFTP 331 is supplied to the AND-gate 247 of FIG. 4 to write the content of NJ 123 in the core memory 161. FFEP 332 indicates the completion of the XEMS instruction and so controls the sequence control circuit 120 as to cause it to return to the instruction fetch routine.

There will now be described by reference to the flow chart of FIG. 6 the operation of the circuits of FIGS. 4 and 5. FIG. 6 represents the flow chart of a microprogram to execute the XEMS instruction. Where, in the case of the XEMS instruction, functional branching is conducted according to the operation code in the instruction fetch routine, the operation proceeds to a step 401. At this stage SCC 103 designates an address immediately ahead of that associated with the instruction word which is being processed. Accordingly, the initial MPW is read out from the core memory at the step 401. At a step 402, SCC 103 is incremented by a unit amount. At a step 403 MPW read out from the core memory is conducted to J 121, E 303 and T 302. Since JRID 252 of FIG. 4 indicates "1" at the step 403, the bits 14 to 23 of MPW are introduced into J 121, whose contents therefore indicate A in the example of FIG. 2. XECS 324 of FIG. 5 also indicates "1," so that the flip-flops T 302 and E 303 are set or reset according to the contents of the bits 11 and 12 of MPW. In FIG. 5, T 302 and E 303 are both reset. Upon completion of the step 403, XECS 324 is changed from "1" to "0," and the AND-gate 313 of the set input of XEC 301 of FIG. 5 is actuated to set XEC 301. At a step 404, a microstep (A address microstep in FIG. 2) read out from F/M 124 according to the content of J 121 is executed. At this time XEC 301 is set, so that NJIT 251 instead of JIT 250 is generated by a timing signal 323. As a result, address information ($\alpha$ in FIG. 2) indicating the microstep to be executed in succession to the microstep already executed is supplied to NJ 123 and not to J 121. At this stage, J 121 is supplied with a particular address "200." A step 405 of FIG. 6 is the one which sets the "200" address in J 121. The steps 404 and 405 are executed as the same microstep. The "200" address of F/M 124 is stored with a step 406, and there is drawn out therefrom TTEST 325 to conduct branching according to the content of T 302. This TTEST 325 also resets XEC 301 of FIG. 5. In the example of FIG. 5, T 302 is reset, so that operation proceeds from the step 406 to a step 418 to test E 303. Since E 303 is also reset, operation goes back to the step 401. At this time the succeeding MPW is read out and SCC is incremented by a unit amount. At the step 403 the B address is set in J 121. Since the contents of both bits 11 and 12 of MPW indicate "1," T 302 and E 303 are set. At the step 404, the B address microstep is NJ supplied with $\beta$. J 121 is set at the "200" 122. Since T 302 is now set, the operation proceeds from the step 406 to a step 407.

At the step 407, the 85 address is brought to the address bus 113 by FAG 130, the contents of W 105 are brought to the B bus 112 and write data 141 are brought to the core memory 161. At the step 407, there the operation is performed of writing the content of W 105 in the particular address (85 address) of the core memory 161. At a step 408, the content of ADR 104 is written in the 84 address. The object of these steps 407 and 408 is to keep the contents of the registers W 105 and ADR 104 stored in the core memory and bring the contents of both registers to the original state at steps 416 and 417 after advancing operations at steps 410 to 415 using said registers W 105 and ADR 104. At steps 409 and 410 a pointer (a pointer for designating a location where the inner state of the CPU is written N address) is read out to be conducted to ADR 104. At a step 411 the contents of NJ 123 are supplied to the core memory through the B bus 112 to conduct tracing. Since, in FIG. 2, NJ 123 contains $\beta$, said $\beta$ is written in an address (N address) designated by the pointer of the 83 address. Then the content of ADR 104 is incremented by a unit amount. At a step 413 its execution is actually performed by means of several divided microsteps. At this point substantially the same operation as to the steps 411 and 412 is conducted with respect to the registers and flip-flops of the CPU, as will be easily understood by those skilled in the art, so that a detailed description of the individual microsteps is omitted. Herein there are used particular addresses 83, 84 and 85. The 83 address is stored with the address of the core memory for storing the address of a microstep to be executed next time. The 84 and 85 addresses are stored with the addresses of the core memory for storing the contents of ADR 104 and W 105, respectively. It will be apparent that these addresses may be arbitrarily selected. When the contents of those registers and flip-flops of the CPU which are required are all written in the core memory, operation proceeds to the step 414. The content of ADR 104 is incremented by a unit amount and the content thus incremented is written in the 83 address at the step 415. This renews the pointer (N address) stored in the 83 address. At the steps 416 and 417 the original contents of ADR 104 and W 105 are read out from the 84 and 85 addresses. At the step 418 operation is brought back to the instruction fetch routine, because E 303 is set. This completes the execution of the XEMS instruction, and the following instruction words are ready to be executed.

There has been described one example of the operation of the present invention. The vital point of the invention is to set J 121 at a particular address (200 address) at the specified steps [404, 405 and 406] of executing the XEMS instruction and store the content [that of NJ 123] in a core memory. Apart from such vital point, there may be contemplated further modifications of the present invention.

Figure 7:
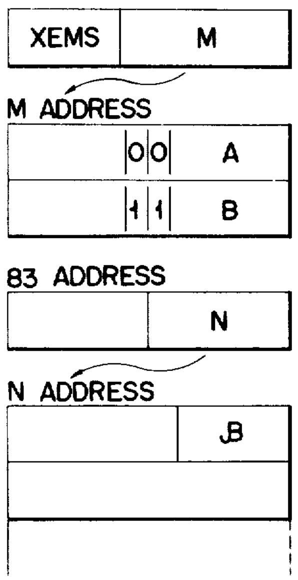
FIG. 7 is an instruction format diagram of a microprogram sequence control according to another embodiment of the invention.

FIG. 7 shows an arrangement for designating the position of MPW by the address section of the XEMS instruction. This figure illustrates the core memory array on the left side of FIG. 2. When the M address of the core memory is designated by the address section of the XEMS instruction, MPW is read out from said M address. To give further explanation, as a means for designating that part of the core memory from which there should be drawn out MPW these may be used ADR 104 of FIG. 3. In the example of FIG. 6, the function of such means corresponds to the step 401 wherein the content of the SCC103 is read out to the address bus 113.

Figure 8:
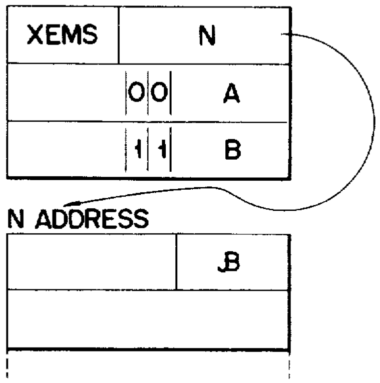
FIG. 8 is an instruction format diagram of a microprogram sequence control according to still another embodiment of the invention.

In FIG. 8 the address section of the XEMS instruction designates that location of the core memory where the inner state of the CPU registers should be written immediately after execution of the designated microsteps. During the execution of the XEMS instruction the aforementioned particular address (N address) should always be kept in ADR 104. In this case, therefore, there is no need to use the fixed addresses (83, 84 and 85), and the steps 407 to 410 and 415 to 417 are no longer required. Otherwise, the location of the core memory where the inner state of the CPU registers should be written may be a fixed location of the core memory.

Figure 9:
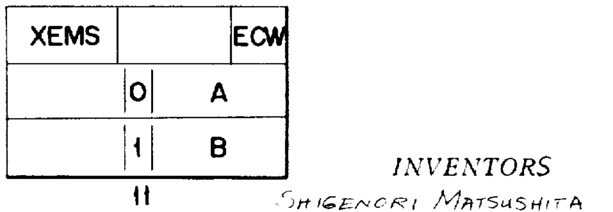
FIG. 9 is an instruction format diagram of a microprogram sequence control according to a further embodiment of the invention.

In FIG. 9, there is provided ECW (execute microstep control word) at the lower part of the address section of the XEMS instruction. The number of MPW's to be executed is designated by said ECW. In FIG. 2 one bit was provided at the 12 bit and the return to the instruction fetch routine was effected by supplying signals representing said additional bit to E 303 of FIG. 5. With respect to FIG. 9 a counter is provided instead of the flip-flop E 303, and the number of MPW's to be executed is controlled by introducing ECW into said counter. When one microstep is executed, the content of said counter is decremented by a unit amount. Return to the instruction fetch routine is conducted according to the content of said counter, because the content of the counter is examined instead of using the step 418 of FIG. 6.

There will now be described a modification where the information of the bit 11 of MPW of FIG. 2 is not used. In this case, the flip-flop T 302 of FIG. 5 is not needed, nor is the step 406 performed. The work of setting the aforesaid particular microstep address (200 address) in J 121 is allotted to the step 407. Then each time a microstep designated by the restrictive MPW's is executed, the contents of the CPU registers upon completion of execution of the microstep designated by MPW are always be written in the core memory.

Figure 6:
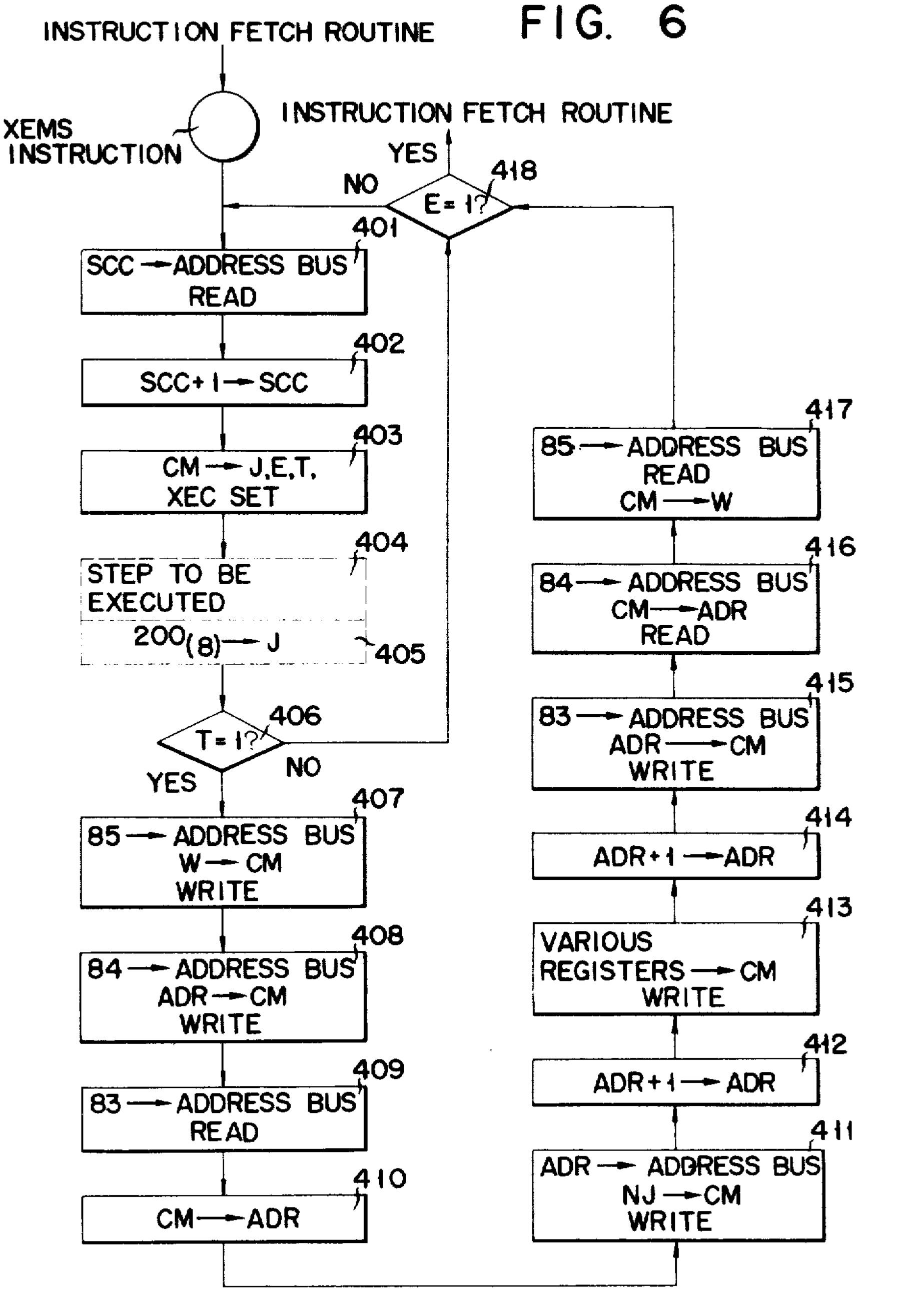
FIG. 6 is a flow chart illustrating the operation of the control shown in FIG. 2.

In FIG. 6 the input gate of NJ 123 is so designed as to be opened at the step 405. However, this input gate may normally be kept open. This input gate is normally opened to store the microaddress of a next microstep to be executed, each time a microstep is executed under control of timing signals generated every microstep. Further, the input gate of NJ 123 may be so controlled as to be kept closed during the period in which the step 406 is started and at least the step 411 is brought to an end. This input gate may be closed from the time the microaddress of the next microstep is stored in the second address register until the microaddress is stored in the main memory.

There will now be described the application of the XEMS instruction. The foregoing embodiments relate only to the diagnosis of a fault in a circuit responsible for the branching of a microprogram. However, it will be apparent that the XEMS instruction is also useful to diagnose a fault in a circuit controlled by the microprogram. Let it be assumed that F/M 124 includes a microstep of storing W 105 with a sum of, for example, positive output from M 100 of FIG. 3 and output from A 101 [C(A) + C(M) → W]. Such microstep is executed by the XEMS instruction and the condition right after its completion is written in the core memory. If, in this case a fault should arise in M 100, A 101, B bus 112, adder 106, main bus 110, W 105, control gates between these circuits or the stored contents of F/M 124 for controlling the operation of said control gates, then the content of W 105 written in the core memory will have a different content due to the effect of such fault. When, therefore the content of W 105, as well as a diagnostic program, is stored in the core memory and comparison is made between the content of W 105 obtained by the XEMS instruction and those already stored in the core memory, then it will be possible to detect such fault. In this case, depending on the relationship between the contents of M 100 and A 101 and the type of fault, W 105 may sometimes have the same content as that which would be obtained in the absence of a fault, despite its actual occurrence. For instance, if, in case such fault arises as causes output of the least significant bit from the adder 106 always to indicate "0," the aforesaid microstep should be executed, then the content of W 105 would be deemed as correct. Accordingly, it is important the analysis be made of all conceivable kinds of faults and the same test be repeated by introducing a number of data into A 101 and M 100 according to the results of said analysis.

There are broadly two procedures for locating the site of a fault. The first procedure is to determine in advance whether a given minimum segment of circuitry works normally using a separate preliminary test, and examine the circuits of the CPU in turn using the properly functioning hardware proved by said preliminary test. Should any fault appear, it will be evident that the circuit now under examination is responsible for the fault, and therefore the site of fault can be readily detected. When a fault is detected another diagnostic procedure may be carried out using data and operations of control gates which are slightly different from those which have been heretofore executed. Comparison of such different data and control gate-operating method with those which actually occurred at the time of fault can locate its site. Let it be assumed that when another microstep performing the operation of (A) + C(M) → W is executed by the XEMS instruction and there are obtained similar erroneous results and that when the same contents as those of A 101 are introduced into Q 102 and a microstep of C(Q) + C(M) → W is executed by the XEMS instruction a correct result is obtained. Then it can be diagnosed substantially definitely that the fault rests with A 101. A combined use of the aforementioned two procedures is well adapted for practical purpose.

Application of the XEMS instruction is not limited to the diagnosis of a fault in the CPU. For example, when another module operating while communicating with the CPU, for example, an input-output channel device or another CPU included in a multiprocess system is given an arbitrary stimulus and a response to said stimulus is examined using the XEMS instruction, then it will be an aid to the diagnosis of a fault in said module. Obviously, the XEMS instruction is effective to combine arbitrary stimuli, impart a stimulus by arbitrary timing or measure a response to such stimuli.

There will now be described the indispensable constituent units of a microprogram sequence control for fault diagnosis according to the present invention. This control comprises a main memory (core memory) for storing an extrinsically variable program instruction and information; a fixed memory (F/M) for storing microprograms each consisting of microsteps capable of information processing operation of the program instruction stored in the main memory; a first address register (J register) for designating the microaddress of said fixed memory (F/M); sequence control circuit operated normally in an intrinsically determined sequence (an ordinary microprogram) to advance the microaddress in the first address register and, during a particular program instruction (XEMS instruction) is executed, so designed as to vary said microaddress by a program information (MPW of the XEMS instruction) accompanying said diagnostic program instruction; a second register (NJ register) for storing at the specified steps [steps 404, 405 and 406] of processing said diagnostic instruction (XEMS instruction) a microaddress of a next microstep to be executed and keeping this microaddress of the next microstep not to be destroyed by means of input gate timing of this address register; and means (NJ → core memory) for storing the content of the second address register in the core memory.

What we claim is:

1. A microprogram execution control for fault diagnosis comprising:

a main memory for extrinsically variable program instructions and information, said instructions including at least one instruction for designating a microprogram for diagnosis;

a fixed memory for storing microprograms each consisting of microsteps capable of information processing operations of said microprogram instructions stored in said main memory;

a first address register for designating microaddresses associated with said microsteps in said fixed memory;

sequence control means for ordinally advancing said microaddresses in said first address register in intrinsically predetermined order and for changing the microaddress in said first address register by a microprogram information accompanying said diagnosis program instruction while this diagnosis program instruction is being executed;

setting means for setting a specified microaddress in said first address register after one microstep designated by said microprogram information is executed;

a second address register including an input gate for storing a microaddress of a next microstep to be executed when said setting means sets said specified microaddress in said first address register; and means for storing the content of said second address register into said main memory.

2. A microprogram execution control for fault diagnosis according to claim 1 wherein said main memory stores said microprogram information at a special location accessable by said diagnostic program instruction.

3. A microprogram execution control for fault diagnosis according to claim 1 wherein said microprogram information includes a particular bit and wherein there is provided a flip-flop circuit responsive to said particular bit of said microprogram information for finishing the execution of said diagnostic program instruction.

4. A microprogram execution control for fault diagnosis according to claim 1 further comprising means for finishing the execution of said diagnostic program instruction by counting the number of said microsteps to be executed.

5. A microprogram execution control for fault diagnosis according to claim 4 wherein said diagnostic program information is accompanied by information specifying the number of said microsteps to be executed and wherein there is provided means for storing said number of said microsteps to be executed, said means having its content changed every time a microstep is executed thereby to finish the execution of said diagnostic program instruction when the content thereof reaches a predetermined value.

6. A microprogram execution control for fault diagnosis according to claim 1 wherein said input gate of said second address register is opened each time only when said microstep designated by said diagnostic program instruction is executed.

7. A microprogram execution control for fault diagnosis according to claim 1 wherein said input gate of said second address register is closed from after said microaddress of said next microstep is stored in said second address register until after said microaddress is stored in said main memory.

8. A microprogram execution control for fault diagnosis according to claim 1 wherein the content of said second address register is stored at a fixed location of said main memory.

9. A microprogram execution control for fault diagnosis according to claim 1 wherein said diagnosis program instruction accompanies an address associated with said main memory into which the content of said second address register is stored.

10. A microprogram execution control for fault diagnosis according to claim 1 wherein the content of said second address register is stored into said main memory according to said microprogram information.

11. A microprogram execution control for fault diagnosis according to claim 10 wherein said microprogram information includes a particular bit and wherein there is further provided a flip-flop circuit responsive to said particular bit of said microprogram information, and wherein the content of said second address register is stored into said main memory only when said flip-flop circuit is set in response to said particular bit of said microprogram information.

12. A microprogram execution control for fault diagnosis according to claim 10 wherein the content of said second address register is stored into said main memory each time a microstep designated by said microprogram information is executed.

* * * * *

UNITED STATES PATENT OFFICE
CERTIFICATE OF CORRECTION

Patent No. 3,696,340 Dated October 3, 1972

Inventor(s) Shigenori Matsushita; Fumitaka Sato; Haruhisa Miura

It is certified that error appears in the above-identified patent and that said Letters Patent are hereby corrected as shown below:

[30] Foreign Application Priority Data

Nov. 9, 1969 Japan 89281/69

Signed and sealed this 20th day of February 1973.

(SEAL)
Attest:

EDWARD M.FLETCHER,JR.
Attesting Officer

ROBERT GOTTSCHALK
Commissioner of Patents

UNITED STATES PATENT OFFICE
CERTIFICATE OF CORRECTION

Patent No. 3,696,340 Dated October 3, 1972

Inventor(s) Shigenori Matsushita; Fumitaka Sato; Haruhisa Miura

It is certified that error appears in the above-identified patent and that said Letters Patent are hereby corrected as shown below:

[30] Foreign Application Priority Data

Nov. 10, 1969 Japan 89281/69

This certificate supersedes Certificate of Correction issued Feb. 20, 1973.

Signed and sealed this 24th day of April 1973.

(SEAL)
Attest:

EDWARD M.FLETCHER,JR.
Attesting Officer

ROBERT GOTTSCHALK
Commissioner of Patents